United States Patent Office 2,884,459
Patented Apr. 28, 1959

2,884,459

DIAMINE DERIVATIVES CONTAINING HYDROXYALKYL GROUPS

Willard H. Kirkpatrick, Sugar Land, and Virgil L. Seale, Houston, Tex., assignors to Visco Products Company, Houston, Tex., a corporation of Delaware No Drawing. Application December 15, 1955
Serial No. 553,182

4 Claims. (Cl. 260—584)

This invention relates to new and useful chemical compositions and more particularly to diamine derivatives containing hydroxyalkyl groups wherein one to three hydroxy ethyl groups are linked to the amino nitrogen atoms of an alkylenediamine and at least one hydroxyhydrocarbyl radical containing a secondary hydroxyl group is linked to at least one of the amino nitrogen atoms of said diamine.

One of the objects of the invention is to provide new and useful chemical compounds which have reactive primary hydroxyl groups and also contain amino nitrogen atoms.

Another object of the invention is to prepare chemical compounds of the type described which are more reactive with respect to the primary hydroxyl group than chemical compounds of a similar type wherein all of the hydroxyl groups are present as secondary hydroxyl groups.

A more specific object of the invention is to provide as a new chemical compound monohydroxyethyltrihydroxypropylethylenediamine.

Another specific object of the invention is to provide as a new chemical compound dihydroxyethyldihydroxypropylethylenediamine.

Still a further object of the invention is to provide as a new chemical compound trihydroxyethylmonohydroxypropylethylenediamine.

Another object of the invention is to prepare such compounds from readily available raw materials. Other objects will appear hereinafter.

In accordance with the invention, new chemical compounds are provided having the following general formula

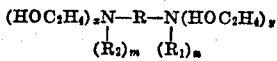

wherein R is an alkylene radical preferably containing 2 to 10 carbon atoms, e.g. ethylene, propylene, butylene, hexylmethylene and decamethylene; $x$, $y$, $m$ and $n$ are 0 to 2 but at least one of the symbols, $x$ and $y$, must be 1, and the total of $x$, $y$, $m$ and $n$ must be 4; $R_1$ and $R_2$ are the same or different saturated or unsaturated hydroxy hydrocarbyl groups such as can be derived, for example, by reacting an oxyethylated alkylenediamine (i.e., a hydroxyethylalkylenediamine) with a hydrocarbyl oxide containing the radical

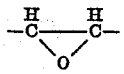

e.g., 1,2-propylene oxide, 1,2-butylene oxide, 2,3-butylene oxide and styrene oxide.

The raw materials used in preparing the new compounds of the invention are an alkylenediamine containing two primary amino groups attached to an alkylene radical or a hydroxy hydrocarbyl alkylenediamine in which at least one hydroxyhydrocarbyl group is substituted for at least one hydrogen atom of the primary amino groups of the alkylenediamine. Thus, in making monohydroxyethyltrihydroxypropylethylenediamine it is possible to use as a starting material hydroxyethylethylenediamine which is available as a substantially pure material. This material is then oxypropylated by the addition of 1,2-propylene oxide until all of the remaining hydrogen atoms attached to the amino nitrogen atoms have been replaced by hydroxypropyl groups in which the hydroxyl group is secondary. It is also possible to make the same compound starting with ethylenediamine which is first oxyethylated by adding ethylene oxide and then oxypropylated by adding 1,2-propylene oxide. Alternatively, the 1,2-propylene oxide can be added first, followed by the ethylene oxide. Ethylenediamine, however, is normally available as a solution in water and therefore the resultant product, although consisting predominantly of a hydroxyethylpolyhydroxyhydrocarbylalkylenediamine will contain a small amount of contaminating water.

The best mode contemplated for the practice of the invention is illustrated by the following examples.

Example I

In a suitable autoclave provided with means of agitation or circulation of the reacting fluids, there was added 104 pounds of hydroxyethylethylenediamine. This chemical was brought up to a temperature of approximately 60° C., whereupon 1,2-propylene oxide was charged into the system to a pressure of 10 pounds per square inch. An immediate exothermic reaction occurred and no further oxide was added until the temperature was brought under control by cooling to below 100° C. The addition of 1,2-propylene oxide was then continued, the temperature being maintained at below 100° C. by continuous cooling. When a total of 174½ pounds of 1,2-propylene oxide had been added to the system, the temperature was slowly increased to 120° C. and held at this point until a constant pressure reading was observed. In a typical preparation this constant pressure was 50 p.s.i. Any residual free propylene oxide was removed by stripping under vacuum.

The resultant product was substantially pure monohydroxyethyltrihydroxypropylethylenediamine.

The physical constants of this substantially pure product are as follows:

Boiling point: 192° C. at 0.5 mm. pressure
Refractive index: $n^{26}D$ 1.4842
Softening point: —4° C. Below this temperature the material sets to a glassy solid
Solubility: Soluble in water in all proportions at temperatures from 0° C. to 100° C.
Specific gravity: 1.057 to 60° F.
Pounds per gallon: 8.8

Example II

In equipment similar to that described in Example I there was added 63.5 pounds of a 95% technical ethylenediamine solution. To this material 44 pounds of ethylene oxide was added gradually at temperatures below 100° C. After the addition of the ethylene oxide was completed, the material was further digested for a period of one to two hours in order that the last traces of ethylene oxide should be reacted. By this time a constant pressure reading was obtained and 174½ pounds of 1,2-propylene oxide was added gradually as in Example I.

Example III

The procedure of Example II was repeated with the exception that 71 pounds of an 85% technical ethylenediamine solution was used in place of 63 pounds of a 95% grade.

Example IV

In a suitable autoclave provided with means of agitation or circulation of the reacting fluids, there was added 104 pounds of hydroxyethylethylenediamine. This chemical was brought up to a temperature of approximately 60° C., whereupon ethylene oxide was charged into the system to a pressure of 10 p.s.i. An immediate exothermic reaction occurred and no further oxide was added until the temperature was brought under control by cooling to below 100° C. The addition of ethylene oxide was then continued, the temperature being maintained at below 100° C. by continuous cooling. When a total of 44 pounds of ethylene oxide had been added to the system, the temperature was slowly increased to 120° C. and held at this point until a constant pressure reading was observed. In a typical preparation this constant pressure was 40 p.s.i. Care was exercised to make certain that there was no free ethylene oxide remaining. After cooling to 60° C. 1,2-propylene oxide was charged into the system to a pressure of 10 p.s.i. Again an exothermic reaction occured and was controlled by maintaining the temperature through cooling below 100° C. The addition of 1,2-propylene oxide was then continued while maintaining the temperature below 100° until a total of 116 pounds of 1,2-propylene oxide had been charged into the system. The temperature was then slowly increased to 120° C. and held at this point until the pressure dropped to a constant reading. Any residual free, 1,2-propylene oxide was removed by stripping under vacuum.

*Example V*

Under conditions similar to those described in Example IV, ethylene oxide was added until a total of 88 pounds had been charged into the system and completely reacted. After cooling the intermediate trihydroxyethyl derivative to 60° C., 58 pounds of 1,2-propylene oxide were added to the system and reacted to yield the trihydroxyethylmonohydroxypropylethylenediamine.

It will be noted that the procedures described in the examples are carried out in the absence of a catalyst while alkaline substances such as sodium hydroxide or sodium methylate are very often used as catalysts in oxyalkylation reactions. The use of such materials in the present case could lead to the addition of the oxyalkylene groups to each other. Such reactions would result in the formation of long chain materials rather than the desired monomers.

The procedure of Example I is especially desirable in that it uses a substantially pure material as a starting material and hence results in a substantially pure product without the presence of contaminating water.

The procedure of Example II yields a product which consists predominantly of the monohydroxyethyltrihydroxypropylethylene diamine and is substantially free of contaminating water but may contain minor percentages of dihydroxyethyldihydroxypropylethylenediamine and trihydroxyethylmonohydroxypropylethylenediamine.

The procedure of Example III is similar to that of Example II except that the product contains a small amount of contaminating water.

The procedure of Example IV leads to the production of a product which consists predominantly of the dihydroxyethyldihydroxypropylethylenediamine.

The compound produced as described in Example I has the following general formula

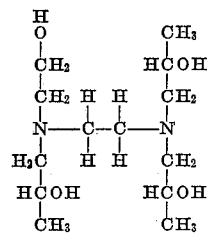

The composition described in Example IV consists predominantly of a compound having the following general formula

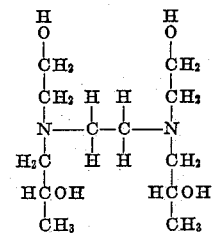

The composition prepared as described in Example V consists predominantly of a compound having the following general formula

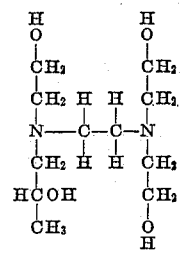

It will be recognized, of course, that in the compositions of Examples IV and V, as well as in the compositions of Examples II and III, various mixtures of isomers can be present.

In a manner similar to that described in Example I other compounds falling within the scope of the general formula can be prepared by substituting other epoxy compounds for the 1,2-propylene oxide. Examples of epoxy compounds which can be substituted for the 1,2-propylene oxide in the procedure of Example I are chemically equivalent proportions of 1,2-butylene oxide, 2,3-butylene oxide, and styrene oxide.

The aforementioned epoxy compounds can also be substituted for 1,2-propylene oxide in Examples II, III, IV and V. Likewise, in Examples II, III, IV and V, chemically equivalent amounts of other alkylenediamines can be substituted for ethylene diamine. Examples of such alkylenediamines are 1,2-propylenediamine, 1,3-propylenediamine, and other aliphatic diamines containing two primary amino groups and two to ten carbon atoms in the alkylene radical.

The compounds prepared in accordance with the invention are suitable for use as intermediates for various types of organic syntheses, for resin formation, in detergent manufacture, and for the preparation of emulsifiers. They are particularly useful as intermediates for the manufacture of esters of carboxy acids because the primary hydroxyl group reacts much more readily with organic carboxy acids such as long chain fatty acids as well as the dicarboxy acids including diglycolic acid, maleic anhydride, and phthalic anhydride than the secondary hydroxyl group. This reactivity is due to the fact that the primary hydroxyl hydrogen is much more labile than the hydrogen of a secondary hydroxyl group. Another advantage of using the compounds of the present invention as compared, for example, to compounds in which the hydroxy alkyl groups contain only secondary hydroxyl groups is that there is no obvious effect attributable to stearic hindrance when the compounds of the present invention are used. The compounds of the present invention can also be employed as starting materials for oxyalkylation reactions in which long chains composed of oxyalkylene groups are added to the hydroxyl groups of such starting materials. Thus, by starting with the compound of Example I in the presence of an alkaline catalyst such as sodium hydroxide or sodium methylate and adding 1,2-propylene oxide long chains can be built up on the terminal hydroxyl groups having a molecular weight of 1200 to 4000 attributable to oxypropylene groups. These compounds can be employed in proportions of 1 part of said compound to from 2000 to 50,000 parts of a water-in-oil petroleum emulsion for the purpose of breaking such emulsion and effecting separation of the water from the oil.

The claims are hereby claimed as follows:

1. A compound having the following general formula:

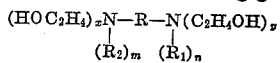

wherein R is an alkylene radical containing 2 to 10 carbon atoms, $x$, $y$, $m$ and $n$ are 0 to 2, but at least one of the symbols, $x$ and $y$, must be 1 and at least one of the symbols $m$ and $n$ must be 1, and the total of $x$, $y$, $m$ and $n$ must be 4, and $R_1$ and $R_2$ are selected from the group consisting of monohydroxy propyl, monohydroxy butyl, and 2-hydroxy, 2-phenyl ethyl groups wherein said monohydroxy groups are secondary hydroxy groups.

2. The compound having the following general formula

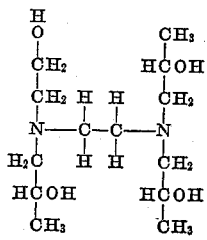

3. The compound having the following general formula

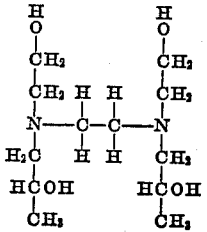

4. The compound having the following general formula

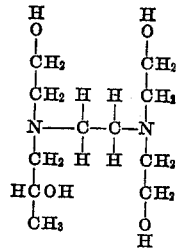

References Cited in the file of this patent

UNITED STATES PATENTS 2,697,118    Lunsted et al. _____ Dec. 14, 1954

FOREIGN PATENTS 801,121    France _____ May 16, 1936

OTHER REFERENCES

Kitchen et al.: Journal of Organic Chem., vol. 8, pp. 342–343 (1943).

Handbook of Chemistry and Physics, 34th ed. (1952–1953), pages 968, 969, 1094, 1095.

Brewster: Organic Chemistry (1948), page 115.